(12) United States Patent
Modrzejewski et al.

(10) Patent No.: US 10,578,207 B2
(45) Date of Patent: Mar. 3, 2020

(54) AIRCRAFT GASEOUS COOLING SYSTEM

(71) Applicant: Bell Helicopter Textron Inc., Fort Worth, TX (US)

(72) Inventors: Brian S. Modrzejewski, Keller, TX (US); Monte McGlaun, Abilene, TX (US); Travis Jurell, Fort Worth, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 363 days.

(21) Appl. No.: 14/340,340

(22) Filed: Jul. 24, 2014

(65) Prior Publication Data

US 2016/0025206 A1     Jan. 28, 2016

(51) Int. Cl.
*F16H 57/04*     (2010.01)

(52) U.S. Cl.
CPC ..... *F16H 57/0442* (2013.01); *F16H 57/0412* (2013.01); *F16H 57/0416* (2013.01)

(58) Field of Classification Search
CPC ............... F16H 57/0413; F16H 57/027; F16H 57/0475; F16H 57/0416; F16H 57/0417; F16H 57/0442; F28D 2021/008; F28D 2021/0089; F28F 9/0246; F28F 9/0248
See application file for complete search history.

(56) References Cited

U.S. PATENT DOCUMENTS

| | | | |
|---|---|---|---|
| 4,105,093 A * | 8/1978 | Dickinson | F01D 25/20 184/104.1 |
| 4,779,489 A * | 10/1988 | Haley | F16H 57/0413 192/82 T |
| 5,344,101 A * | 9/1994 | Francois | B64C 27/006 184/6.11 |
| 7,954,599 B2 * | 6/2011 | Antonetti | F16H 57/0413 184/1.5 |
| 8,141,360 B1 | 3/2012 | Huber | |
| 8,951,157 B2 * | 2/2015 | McGlaun | F16H 57/0442 475/161 |
| 2006/0123777 A1 * | 6/2006 | Schmidt | F16H 57/0413 60/456 |
| 2010/0025159 A1 * | 2/2010 | Gmirya | B64C 27/12 184/6.4 |
| 2010/0064718 A1 * | 3/2010 | Blomquist | F01C 5/06 62/401 |

(Continued)

FOREIGN PATENT DOCUMENTS

| EP | 2738426 | 6/2014 |
| EP | 2977646 A1 | 1/2016 |

(Continued)

OTHER PUBLICATIONS

European Search Report issued in European Application No. 14189246.3 dated Mar. 11, 2015; 3 pages.

(Continued)

*Primary Examiner* — Craig Kim (57) ABSTRACT

One aspect of a cooling system includes a gas source connected to a component to be cooled. The gas source continuously supplies compressed gas to the component in response to an input. The cooling system also includes a controller connected to the gas source, the controller to provide the input to the gas source to continuously supply the compressed gas to the component.

14 Claims, 5 Drawing Sheets

(56) References Cited

U.S. PATENT DOCUMENTS

2013/0213607 A1*   8/2013   Miyamoto .............. F28D 21/00
                                                   165/104.19
2014/0003906 A1*   1/2014   Motto .................... F01D 25/18
                                                   415/1

FOREIGN PATENT DOCUMENTS

JP      2011-213163      10/2011
WO      2011/059450       5/2011

OTHER PUBLICATIONS

Communication pursuant to Article 94(3) EPC issued in European Application No. 14189246.3 dated Apr. 8, 2015, 5 pages.
U.S. Appl. No. 13/687,143, filed Nov. 28, 2012, McGlaun.
Communication Pursuant to Article 94(3) EPC issued in European Application No. 14189246.3 dated Mar. 16, 2016; 4 pages.
European Patent Office, Communication pursuant to Article 94(3) for EP Appl. No. 14189246.3 dated Jul. 21, 2017, 5 pages.
European Patent Office, Communication pursuant to Article 94(3) for EP Appl. No. 14189246.3 dated Feb. 20, 2017, 4 pp.
European Patent Office, Communication pursuant to Article 94(3) for EP Appl. No. 14189246.3 dated Jan. 10, 2018, 5 pp.
European Patent Office, Decision to grant a European patent pursuant to Article 97(1) EPC for EP Application No. 14189246.3 dated Sep. 6, 2018, 2 pp.

* cited by examiner

AIRCRAFT GASEOUS COOLING SYSTEM

TECHNICAL FIELD

This disclosure relates to the removal of heat from a gearbox.

BACKGROUND

In many industrial applications, some engine components (e.g., a gearbox or transmission) generate heat during operation. Lubricant applied within the component facilitates heat transfer and prevents damage due to the generation of excessive heat. Managing the heat generated by a component can be an important safety consideration.

SUMMARY

This disclosure describes technologies relating to removing heat from a transmission with compressed gas.

Certain aspects of the subject matter described here can be implemented as a cooling system. The cooling system includes a gas source connected to a component to be cooled, the gas source to continuously supply compressed gas to the component in response to an input. The cooling system also includes a controller connected to the gas source, the controller to provide the input to the gas source to continuously supply the compressed gas to the component.

This, and other aspects, can include one or more of the following features. The gas source can be a compressor that generates the compressed gas. The compressed gas can have a heat transfer coefficient to transfer heat from the component to atmosphere. The compressed gas can include at least one of helium, air, or argon. The controller can be configured to provide the input to the gas source in response to determining a lubrication failure in the component. The cooling system can include a detection sensor to detect the lubrication failure in the component and provide a notification of the lubrication failure to the controller. The detection sensor can include a pressure sensor to detect the lubrication failure in response to a pressure in the component being greater than a threshold pressure. The detection sensor can include a temperature sensor to detect the lubrication failure in response to a temperature in the component being greater than a threshold temperature. The detection sensor can include a lubrication quantity sensor to detect the lubrication failure in response to a lubricant quantity in the component being less than a threshold lubricant quantity. The cooling system can include a vent valve connected to the controller, the vent valve to vent the compressed gas from the component to atmosphere in response to input from the controller. The controller can be configured to provide input to the vent valve based, in part, on a pressure in the component. The cooling system can include a gas line connecting the gas source to the component and an inlet valve positioned in the gas line and the controller, the inlet valve to permit flow of the compressed gas to the component in response to input from the controller. The cooling system can include a pressure sensor connected to the component and the controller, the pressure sensor to monitor a pressure in the component in response to the compressed gas being flowed to the component from the gas source. The controller can be configured to monitor the pressure in the component sensed by the pressure sensor, determine that the pressure in the component is greater than a threshold pressure, and provide an input to the gas source to stop supplying compressed gas to the component. The component can include a gearbox connected to a rotary shaft, and the gas source can be connected to the rotary shaft to receive power to generate the compressed gas.

Certain aspects of the subject matter described here can be implemented as a method, the method including determining that a lubrication system of a gearbox has failed and including continuously supplying compressed gas to the gearbox in response to determining that the lubrication system has failed.

This, and other aspects, can include one or more of the following features. Determining that the lubrication system has failed can include determining that a gearbox temperature is greater than a threshold gearbox temperature or that a gearbox pressure is greater than a threshold gearbox pressure or that a gearbox lubricant quantity is less than a threshold gearbox lubricant quantity. Continuously supplying compressed gas to the gearbox in response to determining that the lubrication system has failed can include operating an inlet valve positioned in a gas line connecting a compressor to the gearbox to transport the compressed gas generated by the compressor through the gas line to the gearbox. The method can include operating a vent valve connected to the gearbox to vent the compressed gas from the gearbox to atmosphere based, at least in part on, a pressure in the gearbox.

Certain aspects of the subject matter described here can be implemented as a cooling system. The cooling system includes a controller connected to a rotorcraft component and a compressor connected to the controller and the rotorcraft component, the compressor to continuously supply compressed gas to the rotorcraft component in response to the controller determining a failure of a lubrication system of the rotorcraft component.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This disclosure relates to an aircraft gaseous cooling system. Some industrial applications use a variety of lubrication systems to provide wear protection and heat transfer within components such as a gearbox or transmission. Under normal operating conditions, lubrication systems provide proper lubrication and heat removal. However, lubrication systems can fail, resulting in excessive wear and failure of components. Backup cooling systems can provide lubrication if the primary lubrication system fails, for example, for an aircraft (such as a rotorcraft) to maintain manageable flight operations for a duration if the primary lubrication system fails. In some cases, backup cooling systems, such as increased lubrication reserves or a secondary lubrication system, can be used. However, these can add weight and can fail to provide adequate cooling.

This disclosure describes an active cooling system to cool a mechanical component such as a gearbox, transmission, or other component. The cooling system uses a gas source (e.g., a compressor) to continuously supply compressed gas to the component. The compressed gas floods the component and convects heat generated within the component. In some implementations, the generated heat can be transferred from the compressed gas to the component housing where the heat is dissipated, and in some implementations the heat can be transferred from the compressed gas to the atmosphere. A compressed gas supplied at a higher pressure to the component can have improved convective heat transfer characteristics over a gas at a lower pressure (e.g. atmospheric pressure) due to the increased density of the compressed gas. Also, compressing the gas allows a relatively rapid transfer of the gas from the gas source to the component compared to uncompressed gas. A continuous supply ensures that a larger volume of gas is available for cooling over time. As such, a continuous supply of gas can cool the component for a longer duration than a single-use supply of gas. In some implementations, the continuous supply of compressed gas can provide cool gas multiple discrete times.

The disclosed cooling system can be used during normal operation or used as a backup cooling system in response to a failure of a lubricant system. For example, the cooling system can be in a passive state until a primary lubrication system failure occurs and then the cooling system can operate to cool to the component. In some aircraft implementations, the cooling system can provide cooling for the minimum flight time when the primary lubrication system fails. In some implementations, the cooling system can enhance or extend the minimum flight time. The cooling system described can have less weight or volume than other cooling systems such as backup lubrication systems. In some implementations, the cooling system can be added to an existing component or system, e.g., as an add-on kit.

Figure 1:
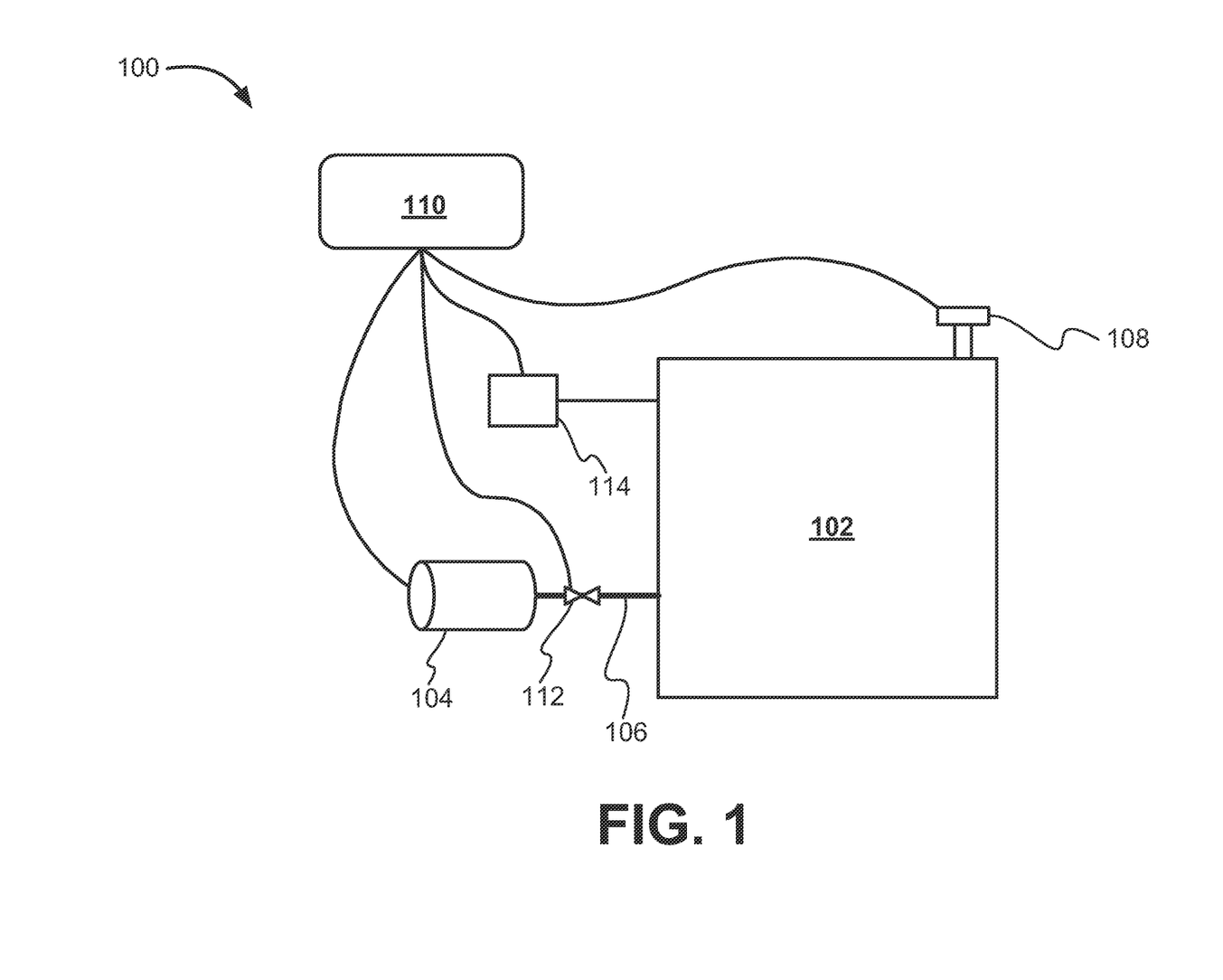
FIG. 1 is a schematic diagram showing an example cooling system.

FIG. 1 illustrates a schematic diagram of an example cooling system 100. The cooling system 100 is connected to a component 102 to be cooled. The component 102 can be a component such as an engine, a gearbox, a transmission, or another component. For example, the component 102 can be a gearbox in a rotorcraft. The component 102 is connected to a gas source 104 via a gas line 106. The gas source 104 is configured to supply compressed gas to the interior of component 102 through the gas line 106. For example, the gas source 104 can be a compressor that pressurizes the gas. The gas source 104 can be powered by an engine such as an electrical or hydraulic engine, directly shafted and or clutched to the 102 component, or by another technique.

The compressed gas supplied by the gas source 104 is a gas with a favorable heat transfer coefficient to transfer heat from the component 102. For example, the compressed gas can be a gas such as helium, air, argon, polymer gas, hydrocarbon gas, or another gas. The compressed gas can also be a mixture of gases, for example, a mixture of 80% helium and 20% argon. The compressed gas can also be atmospheric air pressurized by the gas source 104. The compressed gas can be supplied to the gas source 104 from a separate gas container. For example, containers containing types of gases can be attached to the gas source 104 to generate compressed gases of a type other than air.

An inlet valve 112 can be positioned in the gas line 106 to permit or deny flow of the compressed gas from the gas source 104 to the component 102. The inlet valve 112 can be positioned at the component 102, at the gas source 104, or at any suitable location along the gas line 106.

The cooling system 100 also includes a detection sensor 114 that is coupled to the component 102. The detection sensor 114 can detect if the lubrication system in the component 102 has failed. For example, the detection sensor 114 can include a sensor such as a pressure sensor, temperature sensor, lubrication sensor (e.g., oil pressure sensor), a pressure sensor, combinations of them, or another sensor. In some implementations, the detection sensor 114 includes more than one sensor or more than one type of sensor.

The cooling system 100 also includes a vent valve 108 that is coupled to the component 102. The vent valve 108 can open to vent the compressed gas within the component 102 to the atmosphere. In this manner, the heat transferred to the compressed gas can be then transferred to the atmosphere. If the pressure of the gas within the component 102 is too high, damage to seals and other sub-components can occur. In such a case, the vent valve 108 can open to reduce the pressure within the component 102.

The cooling system 100 also includes a controller 110. The controller 110 can be communicatively connected to the gas source 104, the inlet valve 112, the vent valve 108, and/or the detection sensor 114. In some implementations, the controller 110 can control vent valve 108, inlet valve 112, and gas source 104 to selectively control the introduction of the pressurized gas into the component 102 and the release to atmosphere of gas from the component 102. In this manner, the controller 110 can control the rate at which gas is transferred from the gas source 104 to the component 102 to control the rate of cooling of the component 102. The controller 110 can also control the rate of gas transfer to increase the supply of compressed gas to compensate for gas lost to leaky component 102 seals. The controller 110 can provide inputs to the cooling system 100 components so that a desired pressure of the gas is reached and maintained within the component 102.

The controller 110 is configured to send inputs to the connected components. For example, the controller 110 can send an input to start or stop the gas source 104 or open or close a valve 108, 112. The controller 110 is also configured to receive inputs from connected components. For example, the controller 110 can receive a signal from detection sensor 114. In another example, in response to a high pressure detected in the component 102, the controller 110 can provide an input to the gas source 104 to stop supplying compressed gas to the component 102, or the controller can provide an input to the inlet valve 112 to close the inlet valve 112 to stop the supply of compressed gas to the component 102. In a further example, in response to a high temperature determined by the detection sensor 114, the controller 110 can provide an input to the vent valve 108 to vent the heated gas and provide an input to the inlet valve 112 or gas source 104 to supply fresh, cooler compressed gas. Any of these methods may be used alone or in combination to control the pressure or flow of compressed gas in the cooling system 100.

In another example, the controller 110 can send an input to vent valve 108 to vent the compressed gas from the component 102 to atmosphere. The detection sensor 114 can monitor a pressure in the component 102 in response to the compressed gas being flowed to the component 102 from the gas source 104. For example, the controller 110 can delay the closure of vent valve 108 until the gas within the component reaches a certain pressure. If the pressure in the component 102 is greater than a threshold pressure, the controller 110 can provide an input to the vent valve 108 to vent the compressed gas. In some implementations, the controller 110 is included as part of another system, such as a computer system or other data processing apparatus. For example, the controller 110 can be incorporated as part of the avionics system on an aircraft.

In some implementations, the cooling system 100 includes one or more mechanical interlocks (not shown) to control the gas source 104, inlet valve 112, and vent valve 108. In some implementations, one or more pressure-activated switches or valves coupled to the component 102 control the gas supply into the component 102 or gas venting out of the component 102. For example, a pressure switch coupled to the vent valve 108 can open vent valve 108 when the pressure in the component 102 surpasses a threshold pressure determined by the switch. Other types of switches or valves can be used that monitor temperature, lubrication quantity, or other characteristics. In this manner, in some implementations, parts of the cooling system 100 function without electrical operation or without a controller 110.

Figure 2:
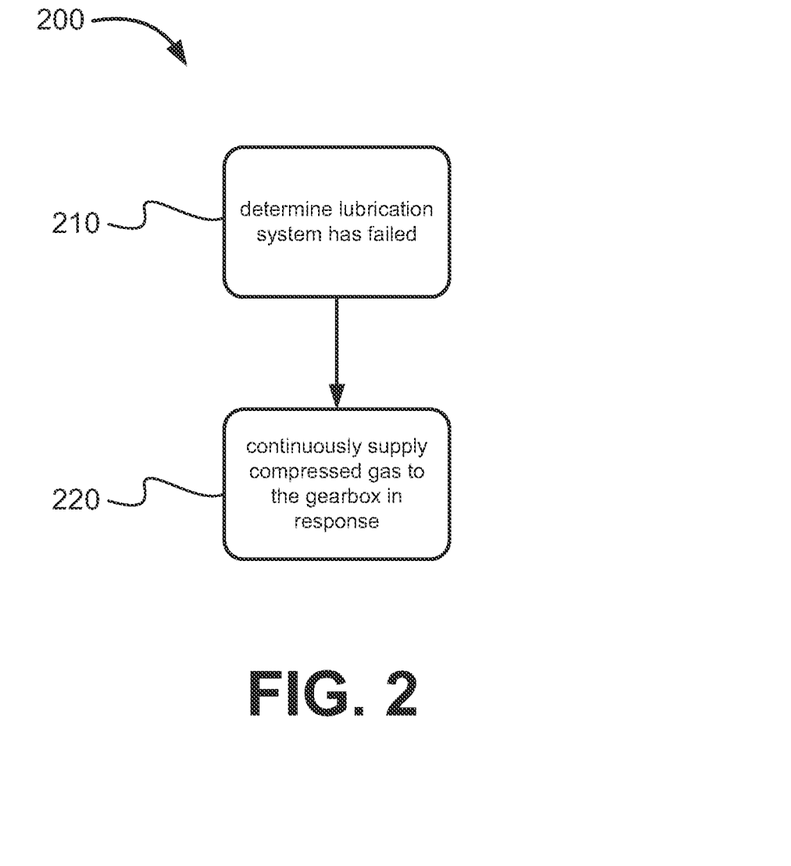
FIG. 2 is a flowchart showing an example process for cooling a component.
Figure 3:
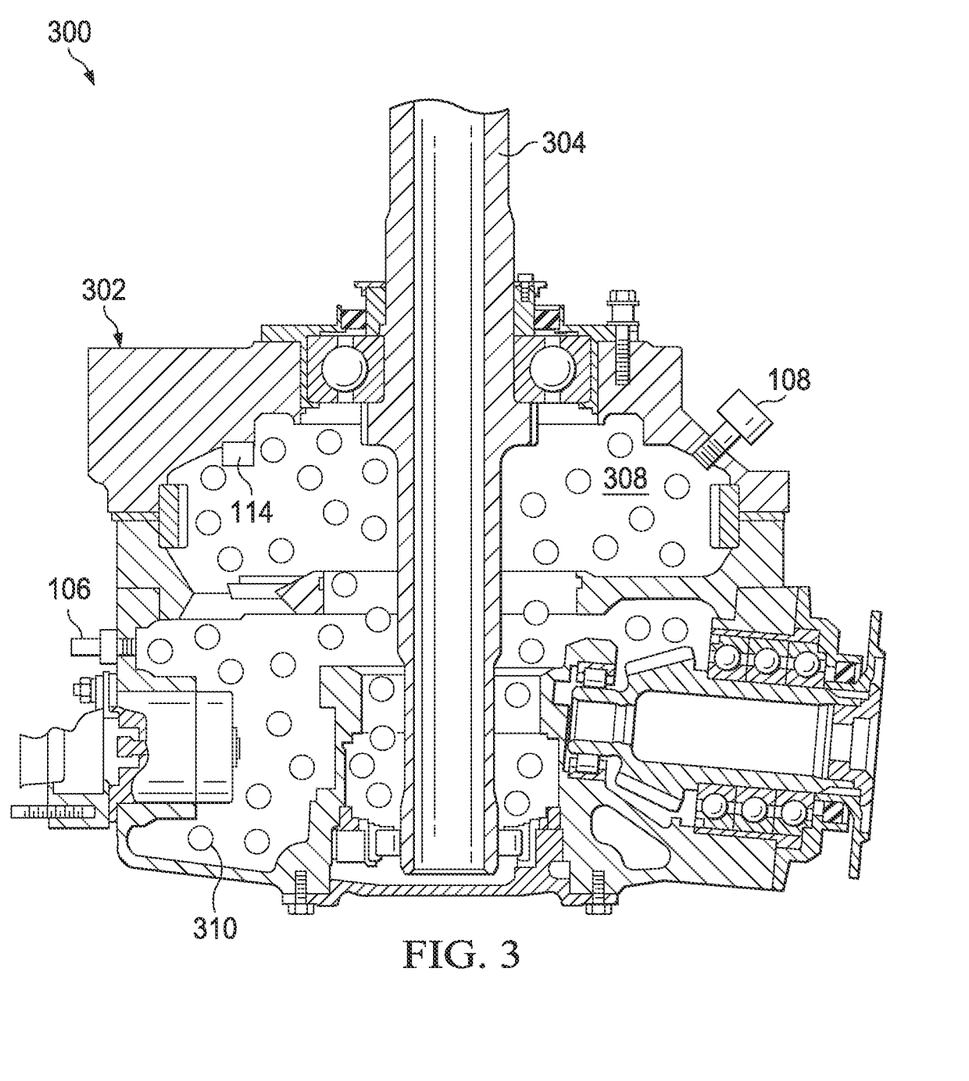
FIG. 3 is a cross-sectional view of an example gearbox including parts of an example cooling system.

FIG. 2 is a flowchart of an example aircraft gaseous cooling process 200. The example aircraft gaseous cooling process 200 can be implemented by example cooling system 100, for example. FIG. 3 shows a cross-sectional view of an example gearbox 300 that is cooled by cooling process 200. The gearbox 300 can be coupled to another component or system such as an engine, aircraft, automobile, or other system as described below. The gearbox 300 includes a housing 302 that encloses internal heat-generating sub-components (e.g. gears, bearings). The housing 302 defines an interior volume 308 of the gearbox 300. The example gearbox 300 includes an example rotary shaft 304 that is coupled to and rotated by internal sub-components. The rotary shaft 304 can be coupled to a system such as a rotor, axle, gearing, or other mechanical system. In some implementations, the rotary shaft 304 is coupled to the gas source 104 (e.g., via an accessory shaft) and the gas source 104 receives power from the rotary shaft 304 to generate the compressed gas 310.

The gas line 106 conducts compressed gas 310 from the gas source 104 to the interior volume 308. The compressed gas 310 in the interior volume 308 convects heat from the heat-generating sub-components and transfers the heat to the housing 302. The heat can then be transferred from the housing 302 to the atmosphere, for instance. The gearbox 300 can also include a vent valve 108 that allows the compressed gas 310 to vent to the atmosphere, transferring the heat from the compressed gas 310 to the atmosphere. In some implementations, the compressed gas 310 is vented into the atmosphere through gearbox 300 seals. The exact locations of gas line 106 and vent valve 108 are implementation specific. Furthermore, the gas line 106 and vent valve 108 can be coupled to gearbox 300 at any practical location.

At 210, the cooling system 100 determines that the lubrication system has failed in gearbox 300. The lubrication system failure can be determined by a detection sensor 114 positioned within the interior of gearbox 300. More than one detection sensor 114 can be positioned within or on the exterior of gearbox 300, and each detection sensor 114 can be positioned at any practical location. In one implementation, the detection sensor 114 includes a pressure sensor (not shown) within gearbox 300 that detects the lubrication failure in response to a pressure in gearbox 300 being greater than a threshold pressure. For example, if the lubrication system has failed, the heat generated in gearbox 300 can increase pressure of the gas within gearbox 300, and the pressure sensor can detect this increased pressure. The pressure sensor may be a pressure transducer, strain gauge, Bourdon tube with deflection gauge, or other active or passive sensor.

Many lubrication systems use pressurized lubricant, and a drop in lubricant pressure can be indicative of lubrication system failure. As such, the detection sensor 114 can also include a pressure sensor (not shown) that detects a lubrication failure in response to a pressure of the lubricant in the lubrication system or gearbox 300 being less than a threshold pressure. In some implementations, the detection sensor 114 detects the quantity of lubrication present in the lubrication system or in gearbox 300, where a low quantity of lubrication is indicative of lubrication system failure. As such, the detection sensor 114 can include a lubrication quantity sensor (not shown) that detects the lubrication failure in response to a lubricant quantity in gearbox 300 being less than a threshold lubricant quantity.

Once a lubrication system fails, one or more sub-components within gearbox 300 can generate excess heat. As such, the detection sensor 114 can include a temperature sensor (not shown) to detect a lubrication failure in response to a temperature in gearbox 300 being greater than a threshold temperature. For example, a temperature sensor can detect the temperature of one or more sub-components (e.g. gears, bearings, or other sub-components) within gearbox 300. A temperature sensor can also detect the temperature of gas within gearbox 300. In other implementations, a temperature sensor detects the temperature of the housing 302 or an interior or exterior surface of gearbox 300. The detection sensor 114 can include more than one temperature sensor.

At 220, the cooling system 100 continuously supplies compressed gas to gearbox 300 in response to determining the lubrication system has failed. In some implementations, the detection sensor 114 provides notification to the controller 110 when a lubrication failure is determined. The controller 110 then provides an input to the gas source 104 or other cooling system 100 components in response to the lubrication failure. For example, the controller 110 can start the gas source 104 to supply the compressed gas to gearbox 300. In some implementations, the controller 110 sends an input to an inlet valve 112. For example, if the gas source 104 has generated compressed air, the input can open the inlet valve 112 to release the accumulated compressed air into gearbox 300.

Figure 4A:
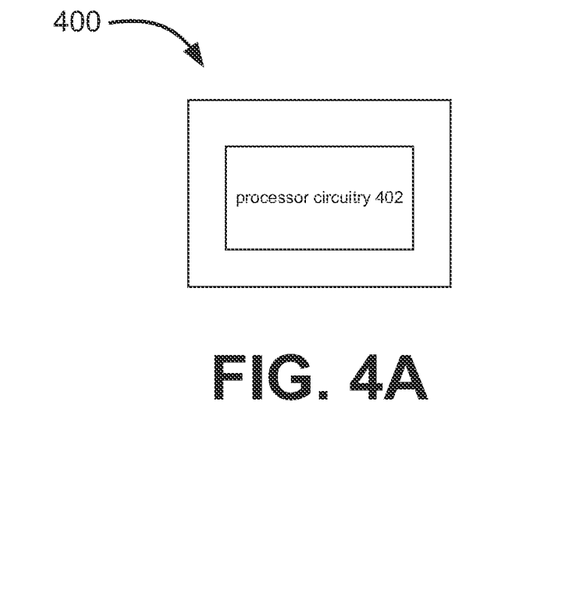
FIG. 4A is a schematic diagram showing an example controller module.

FIG. 4A shows a first implementation of the controller 110. The example controller module 400 shown in FIG. 4A can be implemented as processing circuitry 402. The processing circuitry 402 may perform methods of various aspects of the subject matter described in this disclosure, such as one or more of the operations related to FIGS. 1-3. The processing circuitry 402 can include memory for storing data or instructions, including instructions embodying aspects of the subject matter described in this disclosure. The processing circuitry 402 is configured to communicate with other modules, systems, or components. For example, the processing circuitry 402 can send inputs to cooling system 100 components such as gas source 104 and valves 108, 112.

Figure 4B:
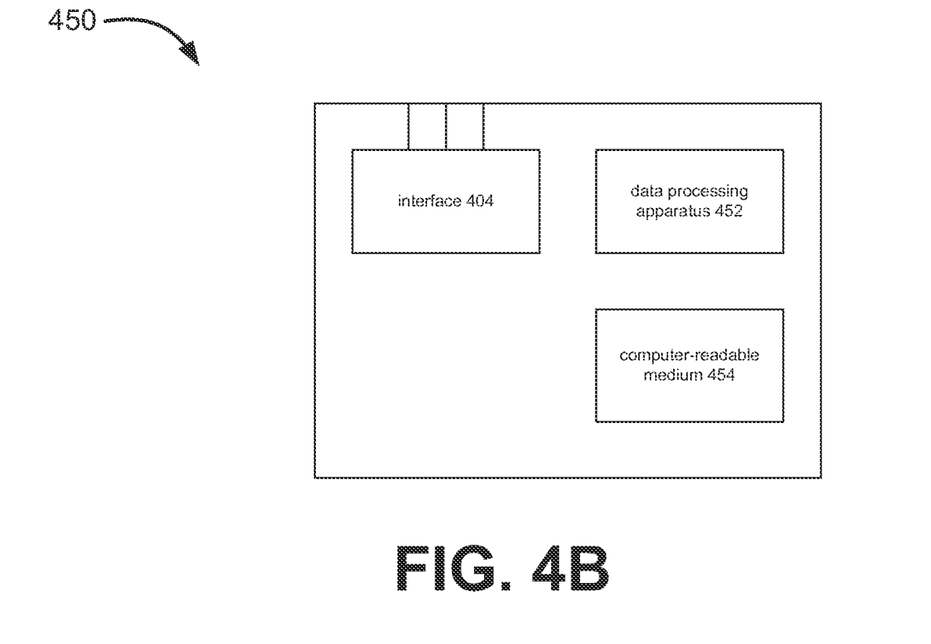
FIG. 4B is a schematic diagram showing an example of a controller implemented as a computing system.

FIG. 4B shows a second implementation of the controller 110 as a computer system 450. The system 450 includes a data processing apparatus 452 (e.g., one or more processors) to execute computer instructions stored on a computer-readable medium 454 to perform operations of the cooling system 100.

Figure 5:
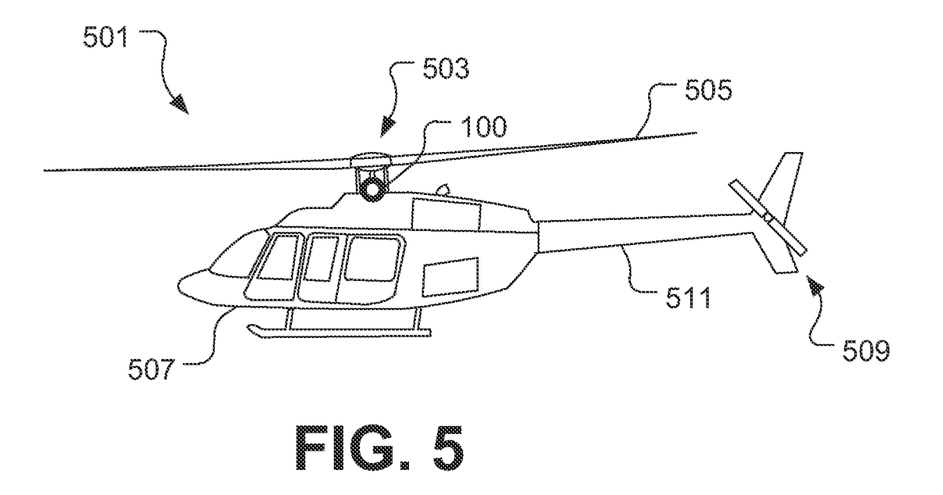
FIG. 5 is a schematic diagram showing an example of a rotorcraft.

FIG. 5 is a schematic diagram of an example rotorcraft 501. Rotorcraft 501 has a rotor system 503 with multiple rotor blades 505. Rotorcraft 501 can further include a fuselage 507, anti-torque system 509, and an empennage 511. The rotorcraft 501 can also include a cooling system, such as example cooling system 100. The cooling system 100 can be implemented in one or more gearbox or transmission assemblies of the rotorcraft 201, as described previously.

Figure 6:
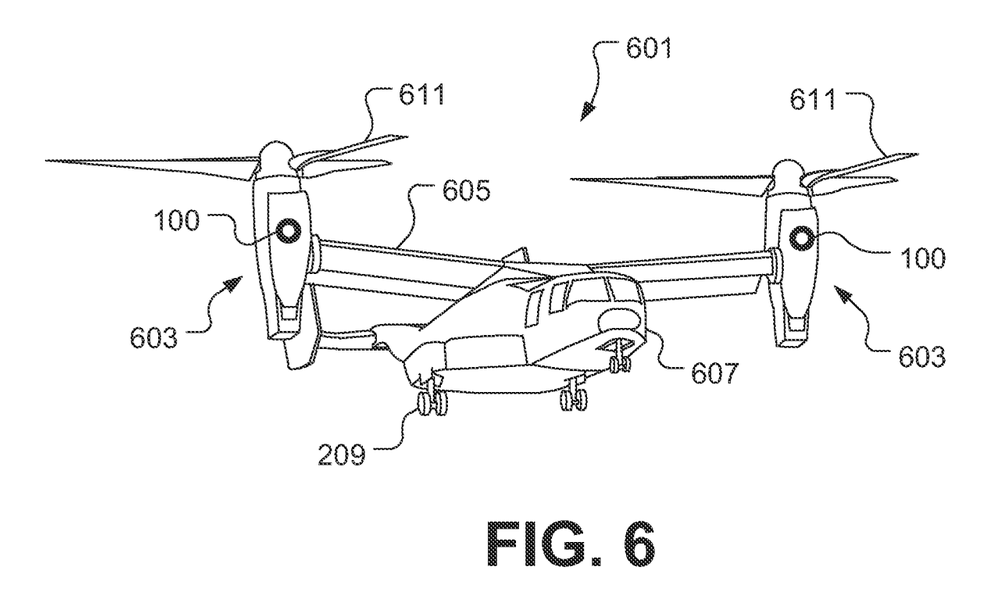
FIG. 6 is a schematic diagram showing an example of a tiltrotor aircraft.

FIG. 6 is a schematic diagram of an example tiltrotor aircraft 601. Aircraft 601 includes a fuselage 607 with attached wings 605. Nacelles 603 are carried at the outboard ends of wings 605 and are rotatable between the helicopter-mode position shown and a forward-facing airplane-mode position (not shown). Nacelles 603 carry engines and transmissions for powering rotor systems 611 in rotation. An engine may be an internal combustion engine, an electrical power source and associated motor, or any other suitable technique for powering rotor system 611. The tiltrotor aircraft 601 can include a cooling system such as example cooling system 100 implemented in one or more gearbox or transmission assemblies of the tiltrotor aircraft 601

The cooling system described in this disclosure can be implemented in a rotorcraft such as shown in FIG. 5 or in a tiltrotor aircraft such as shown in FIG. 6. Indeed, the cooling system can be implemented in any aircraft having a drivetrain component. Furthermore, the cooling system can be used in applications where a component may require heat rejection, including systems with a gearbox or transmission. For example, the cooling system can be implemented in automotive systems (e.g. automobiles, ATVs, motorcycles, or other automotive systems), fixed-wing aircraft, submersible systems, marine systems (e.g. personal watercraft, boats, or other marine systems), agricultural systems (e.g. tractors or other agricultural systems), power equipment (e.g. generators, lawn mowers, or other power equipment), construction equipment (e.g. industrial vehicles, heavy machinery, or other equipment) or other systems.

What is claimed is:

1. A rotorcraft cooling system comprising:
    a compressor connected to a rotorcraft gearbox to be cooled, the rotorcraft gearbox comprising a housing that encloses a subcomponent of the rotorcraft gearbox, the compressor to continuously supply a compressed gas to the housing of the rotorcraft gearbox in response to a first input;
    two or more detection sensors coupled to the rotorcraft gearbox comprising a pressure sensor and a temperature sensor;
    a controller connected to the compressor and the two or more detection sensors, the controller to provide the first input to the compressor to generate the compressed gas and continuously supply the compressed gas to the housing of the rotorcraft gearbox in response to the controller determining a failure of a lubrication system of the rotorcraft gearbox via the two or more detection sensors;
    an inlet valve coupled between the compressor and the housing of the rotorcraft gearbox, the inlet valve connected to the controller and configured to selectively introduce the compressed gas into the rotorcraft gearbox in response to a second input from the controller;
    a vent valve coupled to the housing of the rotorcraft gearbox and connected to the controller, the vent valve configured to selectively vent the compressed gas from the rotorcraft gearbox to an atmosphere in response to a third input from the controller; and
    the controller is configured to monitor a pressure in the rotorcraft gearbox sensed by the pressure sensor, monitor a temperature in the rotorcraft gearbox sensed by the temperature sensor, and in response to determining the failure of the lubrication system control a rate at which the compressed gas is transferred from the compressor to the rotorcraft gearbox by selectively controlling the compressor, the inlet valve and the vent valve to reach and maintain a desired pressure in the rotorcraft gearbox by: (a) in response to determining that the pressure in the rotorcraft gearbox is greater than a threshold pressure, providing the first input to the compressor to stop supplying the compressed gas to the rotorcraft gearbox and/or the second input to the inlet valve to close the inlet valve, or the third input to the vent valve to open the vent valve, and (b) in response to determining that the temperature in the rotorcraft gearbox exceeds a threshold temperature, providing the third input to the vent valve to open the vent valve, and the second input to the inlet valve to open the inlet valve and/or the first input to the compressor to supply the compressed gas to the rotorcraft gearbox.

2. The system of claim 1, wherein the compressed gas has a heat transfer coefficient to transfer heat from the rotorcraft gearbox to atmosphere.

3. The system of claim 2, wherein the compressed gas comprises at least one of helium, air, or argon.

4. The system of claim 1, wherein the controller is configured to provide the first input to the compressor in response to determining the failure of the lubrication system in the rotorcraft gearbox.

5. The system of claim 4, wherein the two or more detection sensors detect the failure of the lubrication system in the rotorcraft gearbox, and provide a notification of the failure of the lubrication system to the controller.

6. The system of claim 5, wherein the pressure sensor detects the failure of the lubrication system in response to the pressure in the rotorcraft gearbox being less than a threshold pressure.

7. The system of claim 5, wherein the temperature sensor detects the failure of the lubrication system in response to the temperature in the rotorcraft gearbox being greater than a threshold temperature.

8. The system of claim 5, wherein the two or more detection sensors further comprise a lubrication quantity sensor to detect the failure of the lubrication system in response to a lubricant quantity in the rotorcraft gearbox being less than a threshold lubricant quantity.

9. The system of claim 1, further comprising:
    a gas line connecting the gas source to the rotorcraft component; and
    wherein the inlet valve is positioned in the gas line to permit or stop flow of the compressed gas to the rotorcraft gearbox in response to the second input from the controller.

10. The system of claim 1, wherein the pressure sensor monitors the pressure in the rotorcraft gearbox in response to the compressed gas being flowed to the rotorcraft component from the compressor.

11. The system of claim 1, wherein the rotorcraft gearbox is connected to a rotary shaft, and wherein the compressor is connected to the rotary shaft to receive power to generate the compressed gas.

12. A method comprising:
 determining that a lubrication system of a gearbox has failed using a controller coupled to two or more detection sensors comprising a pressure sensor and a temperature sensor coupled to the gearbox;
 continuously supplying a compressed gas to the gearbox in response to determining that the lubrication system has failed by the controller using a compressor and an inlet valve coupled between the compressor and the gearbox;
 compressing a gas supplied by a gas container or an atmospheric air using a compressor;
 operating an inlet valve positioned in a gas line connecting the compressor to the gearbox to transport the compressed gas generated by the compressor through the gas line to the gearbox;
 operating a vent valve connected to the gearbox to selectively vent the compressed gas out of the gearbox to atmosphere through the vent valve in response to the controller; and
 the controller is configured to monitor a pressure in the gearbox sensed by the pressure sensor, monitor a temperature in the gearbox sensed by the temperature sensor, and in response to determining that the lubrication system has failed control a rate at which the compressed gas is transferred from the compressor to the gearbox by selectively controlling the compressor, the inlet valve and the vent valve to reach and maintain a desired pressure in the gearbox by: (a) in response to determining that the pressure in the gearbox is greater than a threshold pressure, operating the compressor to stop supplying the compressed gas to the gearbox and/or the inlet valve to close the inlet valve, or the vent valve to open the vent valve, and (b) in response to determining that the temperature in the gearbox exceeds a threshold temperature, operating the vent valve to open the vent valve, and the inlet valve to open the inlet valve and/or to the compressor to supply the compressed gas to the gearbox.

13. The method of claim 12, wherein determining that the lubrication system has failed comprises determining that a gearbox temperature is greater than a threshold gearbox temperature or that a gearbox pressure is greater than a threshold gearbox pressure or that a gearbox lubricant quantity is less than a threshold gearbox lubricant quantity.

14. A cooling system comprising:
 a rotorcraft gearbox comprising a housing enclosing a subcomponent within the housing;
 a controller connected to two or more detection sensors comprising a pressure sensor and a temperature sensor coupled to the rotorcraft gearbox;
 a compressor connected to the controller, the compressor to continuously supply compressed gas to the rotorcraft gearbox in response to a first input from the controller determining a failure of a lubrication system of the rotorcraft gearbox via the two or more detection sensors;
 a gas line connecting the compressor to the rotorcraft gearbox connecting the compressor to the rotorcraft gearbox;
 an inlet valve positioned in the gas line and coupled between the compressor and the housing of the rotorcraft gearbox, the inlet valve connected to the controller and configured to selectively introduce the compressed gas into the rotorcraft gearbox in response to a second input from the controller;
 a vent valve coupled to the housing of the rotorcraft gearbox and connected to the controller, the vent valve configured to selectively vent the compressed gas from the rotorcraft gearbox to an atmosphere in response to a third input from the controller; and
 the controller is configured to monitor a pressure in the rotorcraft gearbox sensed by the pressure sensor, monitor a temperature in the rotorcraft gearbox sensed by the temperature sensor, and in response to determining the failure of the lubrication system control a rate at which the compressed gas is transferred from the compressor to the rotorcraft gearbox by selectively controlling the compressor, the inlet valve and the vent valve to reach and maintain a desired pressure in the rotorcraft gearbox by: (a) in response to determining that the pressure in the rotorcraft gearbox is greater than a threshold pressure, providing the first input to the compressor to stop supplying the compressed gas to the rotorcraft gearbox and/or the second input to the inlet valve to close the inlet valve, or the third input to the vent valve to open the vent valve, and (b) in response to determining that the temperature in the rotorcraft gearbox exceeds a threshold temperature, providing the third input to the vent valve to open the vent valve, and the second input to the inlet valve to open the inlet valve and/or the first input to the compressor to supply the compressed gas to the rotorcraft gearbox.

* * * * *